April 25, 1950  G. W. SHAW  2,505,070
LOAD INDICATOR
Filed Oct. 20, 1945  3 Sheets-Sheet 2

INVENTOR
George William Shaw
BY
Pennie Davis Marvin & Edmonds
ATTORNEYS

Patented Apr. 25, 1950

2,505,070

UNITED STATES PATENT OFFICE 2,505,070

LOAD INDICATOR

George William Shaw, Croydon, Pa., assignor, by mesne assignments, to Kaiser Metal Products, Inc., a corporation of California Application October 20, 1945, Serial No. 623,559

3 Claims. (Cl. 73—141)

This invention relates to measuring devices and particularly to mechanism adapted to determine simultaneously and separately the loads applied by the pilot upon the control stick of an airplane to overcome the loads exerted thereon by the air pressure on the elevators and ailerons during maneuvering of the plane.

In an airplane, movement of the elevators and ailerons is effected through suitable linkages with the control stick. Thus, fore and aft movement of the stick adjusts the elevators and lateral movement effects the desired adjustment of the ailerons. Both of these air foils are subject to air pressure, and the respective loads are transmitted through the linkages to the stick. These loads are overcome by application of equal loads as the pilot shifts the stick to trim the ship or to execute other maneuvers. In continuous operation, the constant application of the counter loads becomes very tiresome for the pilot. Moreover, a pilot accustomed to loads on the stick of any given plane may, on shifting to another, find it difficult to adjust himself to the "feel" of the new plane, and his maneuvering may be faulty or even dangerous for that reason.

It is the object of the present invention to provide a simple and practical device for measuring the loads applied by the pilot to the stick of an airplane.

Another object is the provision of a mechanism for registering simultaneously and separately the loads applied to the stick in adjusting both the elevators and ailerons of an airplane.

A further object of the invention is the provision of an instrument which affords exact information of the loads applied to the stick of an airplane, thereby permitting adjustment of the mechanical advantages between the stick and the elevators and ailerons to meet the requirements of the pilot.

Other objects and advantages of the invention will be apparent as it is better understood by reference to the following specification and the accompanying drawings, in which Fig. 1 is a vertical section through a portion of the control stick of an airplane, showing the invention applied thereto;

Fig. 5 is an elevation of the receiving and indicating device;

Fig. 6 is a front elevation of the structure shown in Fig. 5; and

Figure 1:
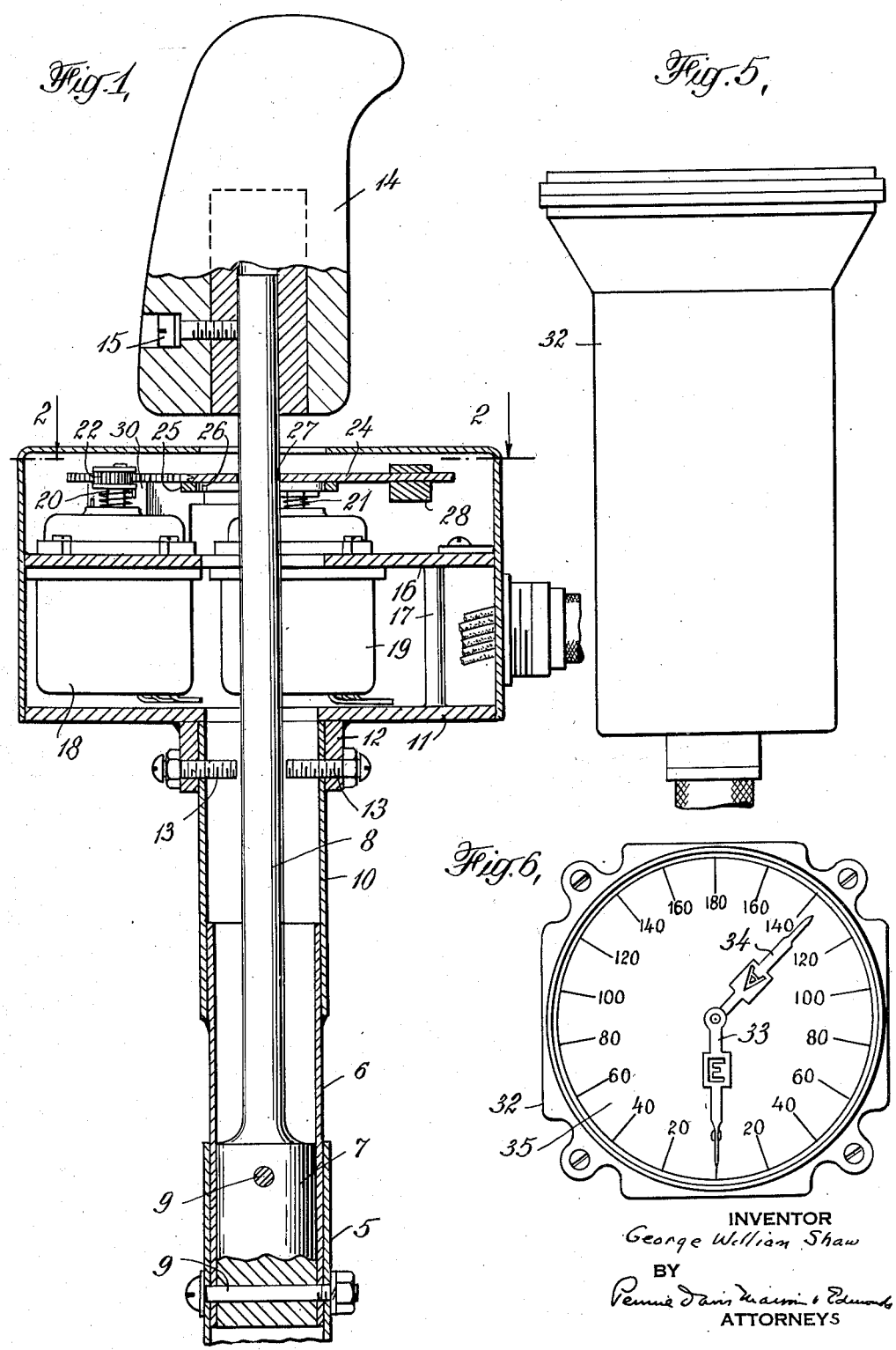
Figure 2:
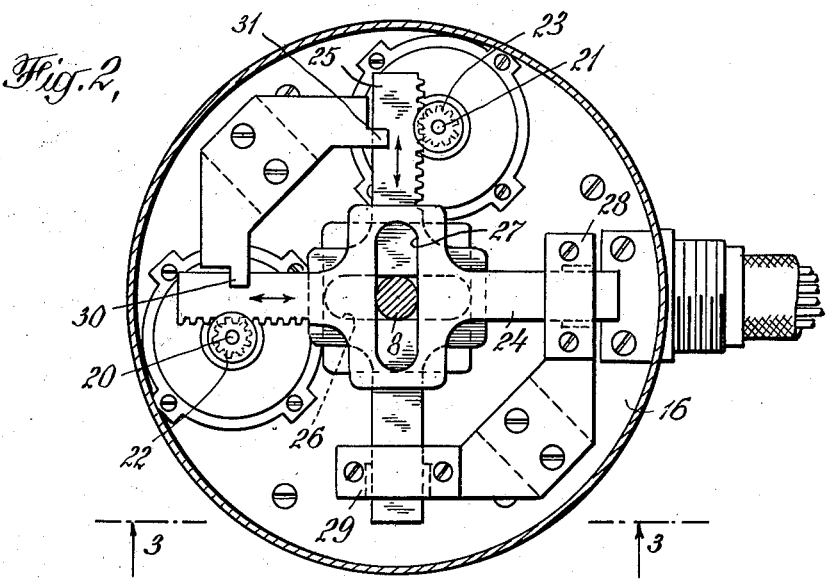
Fig. 2 is a section on the line 2—2 of Fig. 1.
Figure 3:
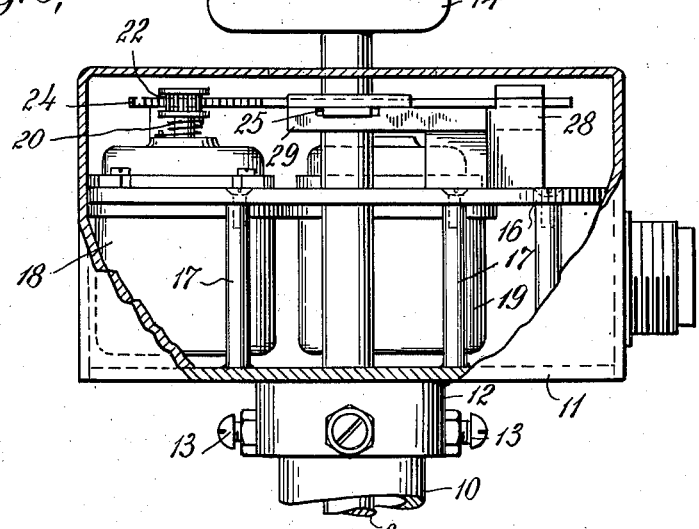
Fig. 3 is a section on the line 3—3 of Fig. 2.
Figure 4:
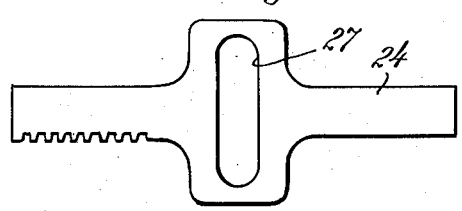
Fig. 4 is a plan view of one of the shiftable bars for transferring deflections of the stick under load.

Referring to the drawing, 5 indicates the control stick of an airplane. A sleeve 6 is disposed therein and the enlarged end 7 of a resilient rod 8 is secured to the stick 5 and sleeve 6 by bolts 9 disposed in perpendicular relation so as to firmly secure the rod 8 to the stick 5. A second sleeve 10 is supported on the sleeve 6 and carries a casing 11 having a circular flange 12 which is welded to the sleeve 10. Screws 13 are adjustable into and out of engagement with the rod 8 to vary the effective length and hence the load range of the rod. An operating handle 14 is secured to the upper end of the rod 8 by a screw 15 and is adapted to be grasped by the pilot in manipulating the stick 5 for the purpose of controlling the movement of the plane. The degree of resiliency of the rod 8 is such that it will be deflected from the axis of the stick 5 in proportion to the load applied by the pilot to the handle 14 in offsetting the load transmitted from the elevators and ailerons. The deflection may be in any direction with respect to the axis of the stick. Normally the stick is moved forwardly or backwardly to adjust the elevators and laterally to adjust the ailerons, but in actual operation two movements may be executed at the same time so that the actual direction of movement is at an angle to the directions of normal operation.

In order to pick up and measure the deflection of the rod 8, the casing 11 contains a plate 16 supported on posts 17. Secured to the plate 16 are two transmitting devices 18 and 19 of the type generally known as "Autosyn." These devices are provided with shafts 20 and 21 carrying pinions 22 and 23. The pinions 22 and 23 are engaged by rack bars 24 and 25 arranged in perpendicular relation and having slots 26 and 27 extending transversely to their longitudinal axes. The slots embrace the rod 8 so that any movement thereof is transmitted to the pinions 22 and 23. The free ends of the rack bars 24 and 25 are supported in brackets 28 and 29 mounted on the plate 16. The opposite ends are held in alignment by brackets 30 and 31 similarly secured to the plate 16. Thus the rack bars can operate only in the direction of their longitudinal axes. Nevertheless, the rod 8 is free to move in any direction from its axis, the perpendicular components of such movement being resolved in the corresponding movements of the rack bars 24 and 25.

The rotary movement of the shafts 20 and 21 effected through the movement of the rack bars 24 and 25 is adapted to create electrical impulses which are transmitted to the indicating device shown in Figs. 5 and 6 through connections hereinafter described. The receiving and indicating device comprises a casing 32, enclosing mechanism (not shown) corresponding to the devices 18 and 19. These devices actuate telescoping shafts carrying respectively the hands 33 and 34 bearing the letters E and A corresponding to elevators and ailerons. The face of the device bears a dial 35 having numerals beginning at zero at the bottom of the dial and reading upwardly on both sides thereof. The two hands 33 and 34 are adapted to move to the right or left, and the device is calibrated so that the movement will indicate the loads applied to the stick in operating both the elevators and ailerons simultaneously. The hands 33 and 34 are shown in the positions indicated in Fig. 6 merely for the purpose of clarity, it being understood that when no load is applied both will be at zero and that they will depart from that position in proportion to the loads applied to the stick resolved into components of fore and aft and transverse movement.

Figure 7:
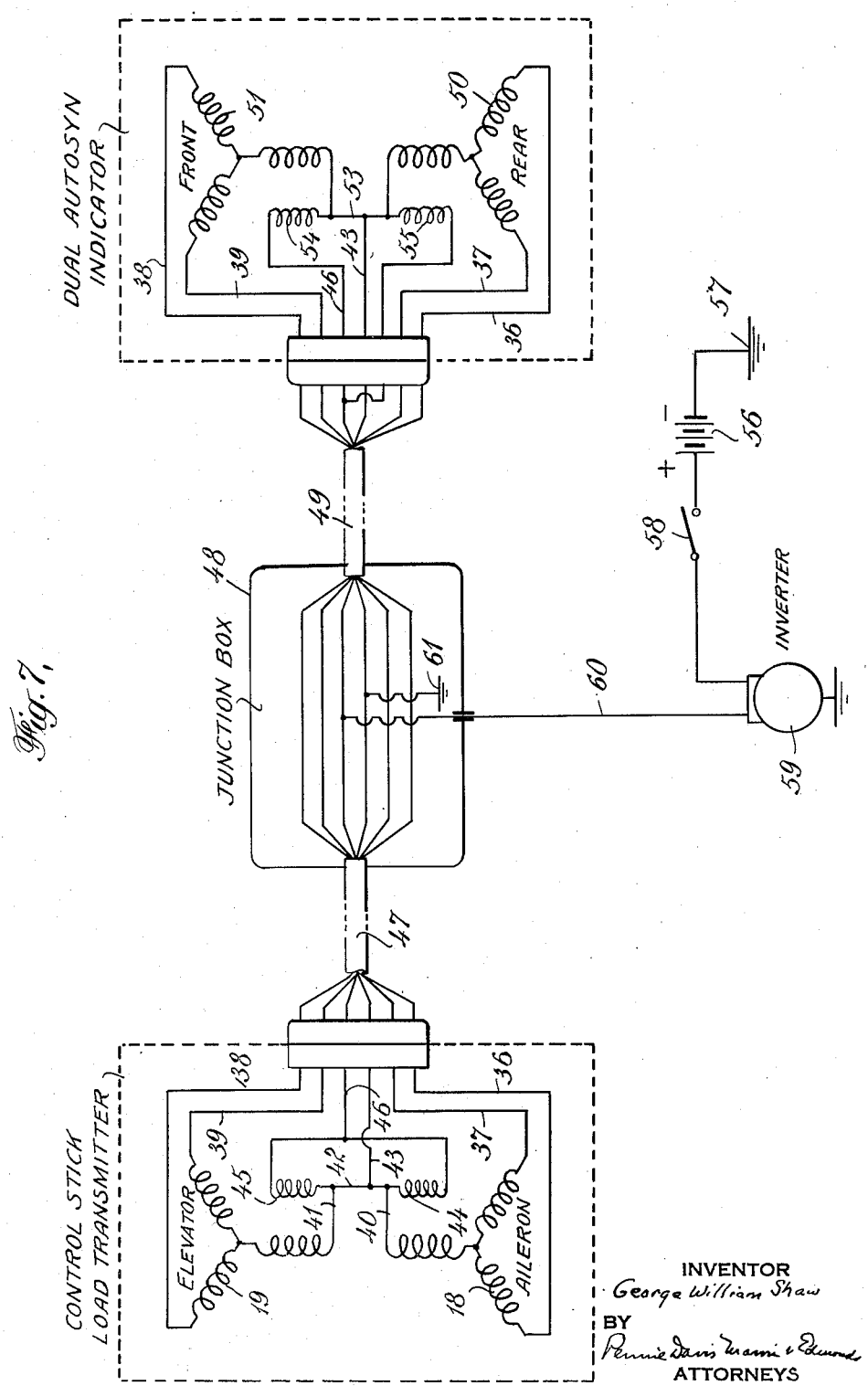
Fig. 7 is a diagrammatic representation of the electrical mechanism for transmitting and receiving indications of deflections in terms of the load applied.

The details of the transmitting and receiving mechanism indicated generally by the devices 18 and 19 form no part of the present invention. Such devices are well known, and descriptions thereof will be found in patents Nos. 1,960,241, 2,038,059, 2,166,610 and 2,272,222. To facilitate an understanding of the principles of the device, reference is made to Fig. 7, which illustrates the transmitter and receiving indicator and the connections between them. Devices 18 and 19 are represented as inductance coils which are connected to conductors 36, 37, 38, 39, 40 and 41. Conductors 40 and 41 are connected through a conductor 42 to a conductor 43 and through inductance coils 44 and 45 to a conductor 46. The conductors 36, 37, 38, 39, 43 and 46 are combined in a cable 47 which conveys them to a junction box 48 whence they are delivered through a cable 49 to the indicating receiver. In the receiver, devices similar to the devices 18 and 19 are indicated at 50 and 51 and are connected to the conductors 36, 37, 38 and 39, and through conductors 53 and inductance coils 54 and 55 to conductors 43 and 46. A source of direct current is provided at 56 and is connected with the ground at 57. A switch 58 is adapted to be closed to deliver current through an inverter 59 and conductor 60 to the conductor 46 in the junction box 48. The conductor 43 in the junction box is connected to the ground at 61. When current is supplied to the device by closing the switch 58, the two devices 18 and 19 transmit deflections of the rod 8 through the electrical connections as described to the indicator, which in turn rotates the shafts carrying the hands 33 and 34 so that the deflections are translated through the calibration on the dial into the forces exerted by the pilot in operating the stick 5 to offset forces transmitted to the stick from the elevators and ailerons.

Thus the device affords a simple, practical and accurate measurement of the loads applied at each instance of operation. The loads may be observed and recorded by an observer watching the movement of the hands 33 and 34 during the operation or, if desired, photographic means may be employed to obtain photographs at regular intervals showing the positions of the hands. Any other suitable recording mechanism may be used in connection with the apparatus.

Various changes may be made in the form, construction and arrangement of the parts without departing from the invention or sacrificing the advantages thereof.

I claim:

1. In a maneuvering load indicator for airplanes having a movable control member which in operation of the airplane has loads exerted thereon, a resilient extension secured to said control member, a plurality of means operable by deflection of said resilient extension for setting up electric pulsations, each of said means including a rotatable member, the relative rotation of which causes the setting up of such electric pulsations, said pulsations being of a magnitude corresponding to the magnitude of said rotation, means for rotating the rotatable member of one of said plurality of means through an angle proportional to the magnitude of deflection of the resilient extension in one direction so that the magnitude of the electric pulsations set up by said rotation is proportional to the magnitude of deflection of the resilient extension in said one direction, means for rotating the rotatable member of another of said plurality of means through an angle proportional to the magnitude of deflection of the resilient extension in another direction so that the magnitude of the electric pulsations set up by said rotation is proportional to the magnitude of deflection of the resilient extension in said other direction, indicator means operable by electric pulsations, and to an extent corresponding to the magnitude of such pulsations, and means for transmitting electric pulsations set up as a result of deflection of said resilient extension in either of said directions to said indicator means, whereby deflections of said resilient extension will be indicated by said indicator means.

2. In a maneuvering load indicator for airplanes having a movable control member which in operation of the airplane has loads exerted thereon, a resilient extension secured to said control member, a pair of means for setting up electric pulsations, a gear for operating each of said means, a pair of indicator means operable by electric pulsations, means for conducting electric pulsations from said first means to said indicator means, and perpendicularly-disposed shiftable rack bars, one meshing with the gear for operating one of said first means and the other meshing with the gear for operating the other of said first means, said rack bars having perpendicularly-disposed slots embracing said resilient extension, whereby on deflection of said resilient means, said rack bars will be moved to rotate the gears for operating said first means to cause electric pulsations to be set up and transmitted to said indicator means, and the deflection of said resilient extension, in perpendicular components, indicated.

3. In a maneuvering load indicator for airplanes having a movable control member which, in operation of the airplane, has loads exerted thereon, a resilient extension secured to said control member, a pair of means for setting up electric pulsations, each of said pair of means including a rotatable member, the relative rotation of which causes the setting up of such electric pulsations, said pulsations being of a magnitude corresponding to the magnitude of said rotation and the magnitude of rotation being determined by the magnitude of deflection of said resilient extension, a pair of indicator means operable by electric pulsations and to an extent corresponding to the magnitude of such pulsations, means for conducting such electric pulsations from said first pair of means to said indicator means, and perpendicularly-disposed shiftable members, one mechanically connected to the rotatable member of one of said first pair of means and the other mechanically connected to the rotatable member of the other of said first pair of means, said mechanical connections causing rotation of the rotatable members when the corresponding shiftable members are operated, each shiftable member being operable by deflection of the resilient extension, whereby deflection of said resilient extension will cause electric pulsations of a magnitude corresponding to the magnitude of said deflection to be set up and transmitted to said indicator means and the deflection of the resilient extension, in perpendicular components, indicated.

GEORGE WILLIAM SHAW.

REFERENCES CITED

The following references are of record in the file of this patent:

UNITED STATES PATENTS

| Number | Name | Date |
| --- | --- | --- |
| 909,421 | Jenkins | Jan. 12, 1909 |
| 1,822,082 | Davis | Sept. 8, 1931 |
| 1,901,673 | Sleeper | Mar. 14, 1933 |
| 2,338,732 | Nosker | Jan. 11, 1944 |
| 2,359,686 | Stanley | Oct. 3, 1944 |

FOREIGN PATENTS

| Number | Country | Date |
| --- | --- | --- |
| 630,368 | Germany | May 7, 1936 |